US009949056B2

(12) United States Patent
Ranieri et al.

(10) Patent No.: US 9,949,056 B2
(45) Date of Patent: Apr. 17, 2018

(54) METHOD AND APPARATUS FOR PRESENTING TO A USER OF A WEARABLE APPARATUS ADDITIONAL INFORMATION RELATED TO AN AUDIO SCENE

(71) Applicant: ECOLE POLYTECHNIQUE FEDERALE DE LAUSANNE (EPFL), Lausanne (CH)

(72) Inventors: Juri Ranieri, Zurich (CH); Ivan Dokmanic, Lausanne (CH); Martin Vetterli, Grandvaux (CH)

(73) Assignee: Ecole Polytechnique Federale De Lausanne (EPFL) (CH)

( * ) Notice: Subject to any disclaimer, the term of this patent is extended or adjusted under 35 U.S.C. 154(b) by 0 days.

(21) Appl. No.: 14/757,445

(22) Filed: Dec. 23, 2015

(65) Prior Publication Data
US 2017/0188173 A1   Jun. 29, 2017

(51) Int. Cl.
*H04R 5/02* (2006.01)
*H04S 7/00* (2006.01)
(Continued)

(52) U.S. Cl.
CPC .............. *H04S 7/306* (2013.01); *G06F 3/013* (2013.01); *G06F 3/167* (2013.01); *G06T 19/006* (2013.01); *G10L 25/54* (2013.01); *H04R 1/1008* (2013.01); *H04R 3/005* (2013.01); *H04R 5/033* (2013.01); *G02B 27/017* (2013.01); *G02B 2027/0178* (2013.01); *H04R 1/028* (2013.01); *H04R 1/342* (2013.01); *H04R 5/027* (2013.01); *H04R 25/00* (2013.01); *H04R 25/552* (2013.01);
(Continued)

(58) Field of Classification Search
CPC .. H04S 7/306; H04S 2400/11; H04S 2400/15; H04S 7/304; G06F 3/013; G06F 3/167; G06T 19/006; G10L 25/54; H04R 5/033; H04R 1/028; H04R 1/1008; H04R 3/005; H04R 5/027; H04R 25/00; H04R 25/552; H04R 2205/041; G02B 2027/0178; G02B 27/017
See application file for complete search history.

(56) References Cited

U.S. PATENT DOCUMENTS 6,208,353 B1   3/2001   Ayer et al.
2011/0091057 A1   4/2011   Derkx
(Continued)

FOREIGN PATENT DOCUMENTS

EP   2 629 242 A1   8/2013
WO   WO-2014/113891 A1   7/2014

*Primary Examiner* — Andrew L Sniezek
(74) *Attorney, Agent, or Firm* — Blank Rome LLP (57) ABSTRACT

A method for modifying an audio scene and/or presenting additional information relevant to the audio scene includes capturing audio signals from the audio scene with a plurality of microphones; outputting an audio signal with a plurality of acoustical transducers; processing the captured audio signals, where the processing comprises one or more of filtering, equalization, echoes processing, and beamforming; separating and distinguishing audio signal sources using the processed audio signals; selecting at least one separated audio signal source; classifying the at least one selected separated audio signal source; retrieving additional information related to the classified audio signal source; and presenting the additional information in a perceptible form.

17 Claims, 3 Drawing Sheets

(51) Int. Cl.
   *H04R 5/033* (2006.01)
   *G10L 25/54* (2013.01)
   *G06T 19/00* (2011.01)
   *G06F 3/16* (2006.01)
   *G06F 3/01* (2006.01)
   *H04R 1/10* (2006.01)
   *H04R 3/00* (2006.01)
   *G02B 27/01* (2006.01)
   *H04R 1/02* (2006.01)
   *H04R 1/34* (2006.01)
   *H04R 5/027* (2006.01)
   *H04R 25/00* (2006.01)

(52) U.S. Cl.
   CPC ........ *H04R 2205/041* (2013.01); *H04S 7/304* (2013.01); *H04S 2400/11* (2013.01); *H04S 2400/15* (2013.01)

(56) References Cited

U.S. PATENT DOCUMENTS

| | | | |
|---|---|---|---|
| 2012/0293702 A1* | 11/2012 | Siulinski | G02B 27/017 348/333.09 |
| 2013/0094682 A1* | 4/2013 | Lee | G02B 27/01 381/306 |
| 2014/0253701 A1 | 9/2014 | Wexler et al. | |
| 2015/0106053 A1 | 4/2015 | Ocal et al. | |
| 2015/0332094 A1* | 11/2015 | Im | G06K 9/00671 348/158 |

\* cited by examiner

METHOD AND APPARATUS FOR PRESENTING TO A USER OF A WEARABLE APPARATUS ADDITIONAL INFORMATION RELATED TO AN AUDIO SCENE

FIELD OF THE INVENTION

The present invention concerns a method and apparatus for presenting additional information related to an audio scene.

DESCRIPTION OF RELATED ART

Augmented reality devices were initially described in U.S. Pat. No. 6,208,353. This patent describes a solution where a view of a scene is augmented by annotating objects of the scene.

Today, augmented reality applications are widely available on smartphones and personal computers.

Augmented reality (AR) is a live direct or indirect view of a physical, real-world environment whose elements are augmented (or supplemented) by additional information, such as text, annotations or graphics.

EP2629242 and US2014253701 both describe a head-mounted apparatus with a camera and a processor for audibly reading text retrieved from a captured image. In this solution, the visual scene is augmented with audio comments.

Solutions for augmenting an audio scene have also been suggested. In WO14113891A1, devices process sound signals, localize sound signals corresponding to one or more sound sources, and render, on a wearable display device, an acoustic visualization corresponding to localized sound sources. A wearable visualization device may include two or more microphones for detecting sounds from one or more sound sources, and display devices for displaying the acoustic visualizations.

US2011091057A discloses an apparatus, such as a pair of glasses, including a portable hearing aid device, a plurality of sound detectors, and electronic circuitry. The sound detectors are coupled to the portable hearing aid device. The electronic circuitry is electronically coupled to the plurality of sound detectors. The electronic circuitry generates a reproduced sound signal based on sound signals from at least a subset of the plurality of sound detectors.

Each of those solutions provide a modified, augmented reality to the user, i.e., a visual and/or acoustic representation of a real-world scene which includes additional information not present in the real scene.

BRIEF SUMMARY OF THE INVENTION

It is an aim of the present invention to provide a new method and a new apparatus for augmenting the reality.

According to the invention, these aims are achieved by means of a method for presenting to a user of a wearable audio device a modified audio scene together with additional information related to the audio scene, comprising:
- capturing audio signals with a plurality of microphones;
- processing the captured audio signals, the processing comprising filtering, equalization, echoes processing and/or beamforming;
- separating audio sources from the processed audio signals;
- selecting at least one separated audio source;
- classifying at least one audio source;
- retrieving additional information related to the classified audio source;
- presenting the additional information to the user.

This method thus present to the user additional information, for example computer generated or retrieved information, related to a real-world audio scene which is not present in the scene, and which depends on the classification of a selected audio source in the scene.

In one aspect, the invention is thus related to the separation of audio sources from processed audio signals, to the classification of at least one audio source, and to the retrieval and presentation of additional information related to this source.

In this application, an audio source is a sound signal that comes from a specific location in the environment. The method may distinguish and separate different audio sources present in one audio signal, or in a plurality of audio signals from different microphones. A given audio signal, captured in a given environment (the audio scene) may include a plurality of audio sources. Different audio sources in an audio signal may have different type—for example, one audio source may correspond to the song of bird and another audio source may correspond to the wind in the trees. Different audio sources in an audio signal may also have the same type—for example, different cars producing identical noise, or different loudspeakers playing the same music. The method comprise a step of separating different audio sources depending on their position in the audio scene, and possibly based on characteristic of the source (for example in order to distinguish speech from other type of sources).

In one aspect, the invention is related to the localisation of an audio source. The localisation of one audio source may use the time of arrival of different echoes of the audio signal emitted by the audio source. The localisation may be assisted by using information in the video signal, for example by determining the position of visual features in one or a plurality of frames. The localisation of one audio source may be relative to the user (for example "behind you", "5 meters to you left", "North", etc), or absolute (for example with geographic coordinates, names of places, etc). An audio source may be tracked over different video frames.

The localisation of audio sources may be used for separating the different audio sources and/or for selecting the additional content to be presented, and/or the way this additional information is presented. For example, the localisation of an audio source may be used for determining the text to display or to speak, and the place where this text is displayed or from where it is spoken.

The additional information may thus be related to the location and to the classification of the audio source.

In one aspect, the invention is related to the localisation of the apparatus. The localisation of the apparatus may use the time of arrival of different echoes of audio signals emitted by different audio sources. The localisation may be assisted by using information in the video signal, for example by determining the position of visual features in one or a plurality of frames. The localisation may use other sensors of the apparatus, including a GPS, an inertial sensor, a Wi-Fi receiver, a RFID reader, etc., for determining the position of the apparatus or the position of an audio source, and for tracking the apparatus or an audio source.

The localisation of the user may be used for selecting the additional content to be displayed. It may be used for selecting a scenario.

The additional information may be retrieved from a database. For example, the additional information may include a text or spoken description or information related to a selected audio source.

The additional information may also be computed or derived from the original audio source. For example, the additional information may include a text transcription of a voice, or a translation of an utterance.

The auditory information is thus parsed, processed and enhanced, enabling the user to control what and how he hears, and which additional information he wants to be presented with.

In one example, a user in a forest may use the method to record an audio signal, to select the song of a bird among all the audio sources, and to be presented with information related to this bird, such as, for example, the name of the bird.

In one aspect, the method comprises a step of shaping a modified audio signal, and delivering the modified audio signal with a plurality of acoustical transducers.

The modified audio signal may comprise a modified audio source, for example an enhanced, augmented, moved or otherwise transformed audio source.

In the above example, the user may be presented with a modified audio scene in which the song of a selected bird is amplified or otherwise enhanced.

The additional information may be presented acoustically, as part of the modified audio signal. In one example, the additional information is presented as an additional source whose position does not necessarily correspond to the position of the augmented audio source. This additional information thus represents an acoustic annotation or comment to an acoustic source.

The additional information may be presented visually, for example on a display, with glasses or with a head-up display.

The additional information may be displayed as text, hypertext, still image, video, chart, etc.

The additional information may be displayed on a display at a position which depends of the position of the audio source. For example, the name of a bird could be displayed next or close to the position of the bird, or in the direction of the audio source if the bird is not visible.

In one aspect, the invention is related to the selection of a previously separated and possibly classified audio source, in order to augment this source.

The selection of an audio source may be made by pointing at the source, for example with hand gestures. In the above example, the user may point at the bird with his finger in order to select the bird as audio source and have the name of the bird displayed or spoken.

The selection of an audio source may be made by gazing at the audio source. In the above example, the user may gaze at the bird in order to have the name of the bird displayed or spoken. An eye-tracking module may be integrated into the apparatus for determining the gaze direction.

The selection of an audio source may be made with speech commands. In the above example, the user may say "bird" in order to have the name of the bird displayed or spoken.

The selection of an audio source may be automatic. In one example, the method selects the loudest or the most distinctive audio source among all the separated sources.

The automatic selection of audio source may depend on the user's location. In the above example, the apparatus may automatically select birds as audio sources when the user is in a forest. In a classroom, the teacher may automatically be selected as audio source.

The automatic selection of audio source may depend on the user's characteristics. In one example, the user's characteristics include a user profile. The user profile may include user's preferences. In the above example, a user may include "birds" in his preferences, in order to have all bird songs selected as audio sources.

In one aspect, the invention is related to the creation, storage and use of scenarios for defining which audio sources should be classified or otherwise modified in a given environment or for a given user.

The scenarios may be stored and/or selected in the apparatus. In a preferred embodiment, the scenarios are stored and/or selected in a remote server or in the cloud. This makes the sharing and/or improvement of scenarios easier and more versatile.

The selection of a selected audio source may depend on a scenario. A scenario may be selected among a plurality of scenarios and defines which audio source(s) is or are to be enhanced or augmented in a specific environment or for a specific user.

For example a first scenario "forest" may be used when the user is in a forest, in order to have birds selected as audio sources. A second scenario "classroom" may be available for selecting the teacher as audio source when the user is in a classroom.

A scenario may be shared among a plurality of users.

The method may include a step of tracking a selected audio source.

The method may include a step of adding a virtual audio source. For example, the user in a forest may add a virtual bird to the audio scene. The virtual audio source may be synthetic or pre-recorded.

The method may include a step of modifying an audio source. The modification may include increasing the volume, modifying the echoes, modifying the position of the audio source, improving the clarity, removing the audio source, replacing the audio source, etc.

The method may include a step of determining the shape of a room in which the wearable apparatus is located, and recreating a virtual auditory environment that fits said room acoustic and in which a selected audio source is enhanced.

In one aspect, the invention is also related to a user wearable apparatus for presenting additional information related to an audio scene, comprising:

a plurality of microphones for capturing audio signals;

a plurality of acoustic transducers;

an audio pre-processing module for pre-processing said audio signals, the pre-processing comprising filtering, equalization, echoes processing and/or beamforming;

an audio source selection module for selecting at least one selected audio source from said audio signals;

a sound classification module for classifying audio sources;

an additional information retrieving module for retrieving additional information related to said selected audio source;

an information presentation module arranged for presenting said additional information to said user.

The user wearable apparatus may comprise one or a plurality of digital cameras.

The user wearable apparatus may be head-worn. The user wearable device may be shaped as glasses or head-up display.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
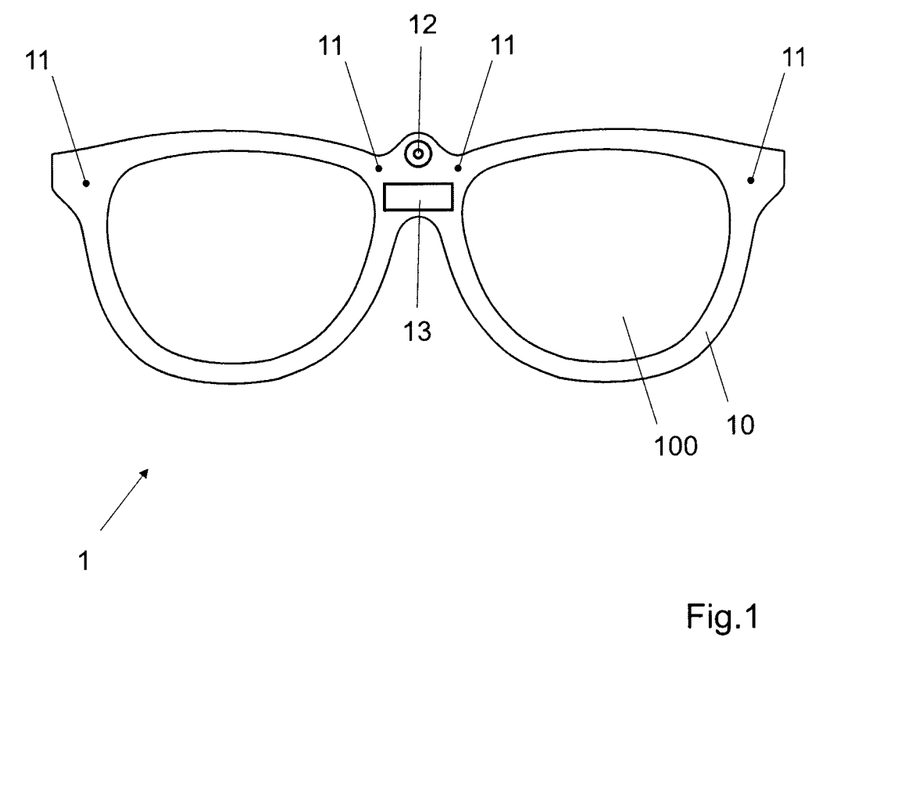
FIG. 1 is a graphical representation of a possible embodiment of an apparatus according to the invention.
Figure 2:
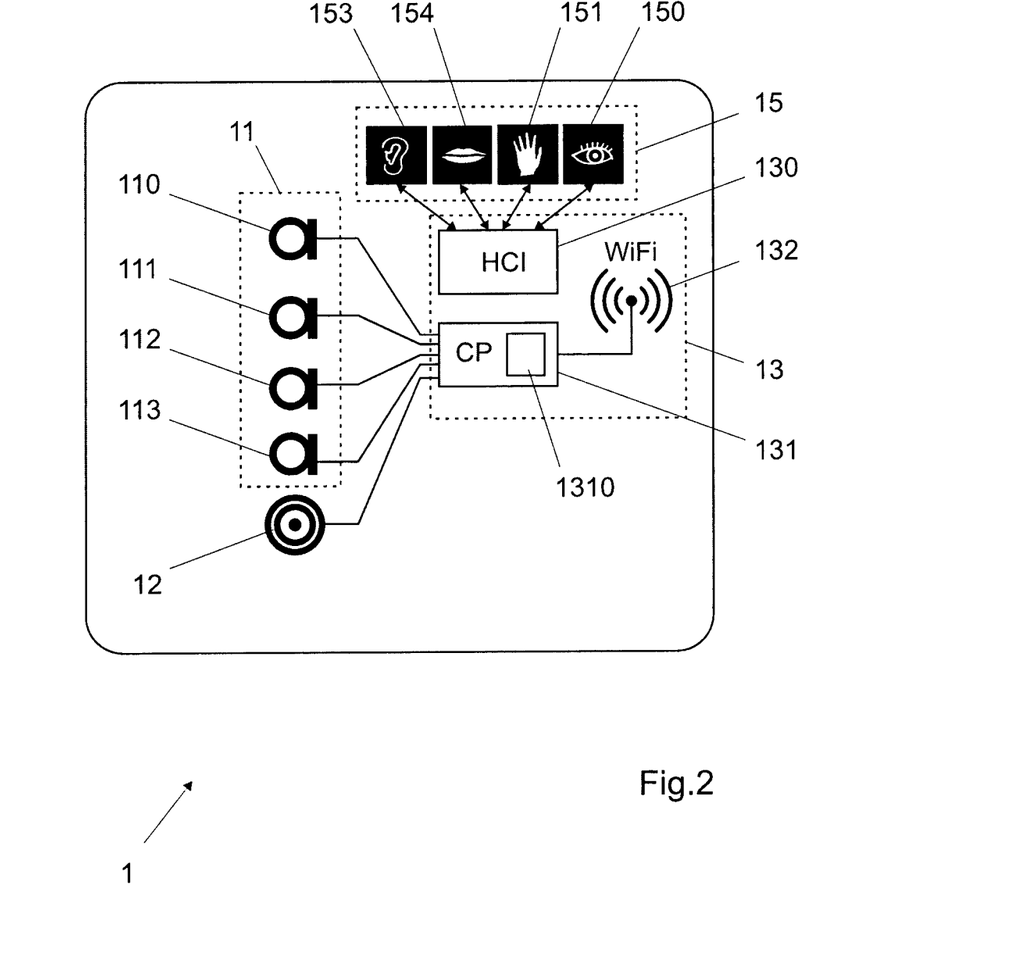
FIG. 2 is a schematic bloc diagram of the hardware components of the apparatus.

FIG. 1 schematically illustrates a possible embodiment of a wearable apparatus 1 according to the invention. FIG. 2 is a block diagram of some possible components of this apparatus. In this embodiment, the apparatus 1 is shaped as a pair of glasses with two lenses 100 or displays set in a frame 10 worn on the nose and ears. The frame may be 3D printed. Alternative form factors are possible, including without limitation other head-worn devices such as head-up displays, goggles, hearing aids, hearing buds, tablets, smartphones or computers.

The apparatus 1 further includes a plurality of microphones 110,111,112,113, for example one or a plurality of microphone arrays 11, for capturing audio signals from a plurality of directions. In the illustrated example, one microphone array 11 is provided on one side of the frame 10. Another microphone array could be provided on the other side of the frame. Microphones could also be provided on the branches of the glass. The microphone may be an audio microphone; in a preferred embodiment, it could also capture ultrasounds, for example in order to classify, visualize and/or augment ultrasounds as well as audible sounds.

At least one camera 12 is provided for capturing an image of the scene in front of the user. The camera could be a conventional CCD camera, or a stereo, depth or plenoptic camera for providing additional information about the light field in front of the user and the distance to features in the scene. A motion sensing input device may also be provided. The camera could be still or preferably a video camera for providing sequences of video frames.

The apparatus 1 further includes a processing unit 13, such as for example a digital processing unit including hardware and software modules for performing the steps of the method of the invention.

The apparatus 1 may also include acoustical transducers, such as earphones or headphones 153, for providing spatialized audio and rendering a modified audio reality. The acoustical transducers may be included in the branches to the glasses, or attached to the other components of the apparatus by audio cables.

The apparatus 1 may be connected to external devices over a wireless interface 132, such as, without limitation, a Wi-Fi, Bluetooth, NFC, etc. The external device may include for example a smartphone, smartwatch, tablet or personal computer for controlling the apparatus, for rendering additional information related to the scene, and/or for connecting the apparatus to the Internet A display 150 may be provided for displaying information to the user, such a menu commands and/or additional information related to the audio scene. The display may be provided as a head-up display, head-mounted display, stand-alone display, or as part of the external device, such as a smartphone, smartwatch, tablet or personal computer, wirelessly connected to the apparatus.

The apparatus 1 may be controlled over various control interfaces 15, including without limitation a haptic interface (such as buttons), a tactile interface 151, a speech recognition module 154 for recognizing voice commands, an eye-tracking input command module, etc. Alternatively, or in addition, the apparatus may be controlled by the remote device, such as a smartphone, smartwatch, tablet or personal computer, wirelessly connected to the apparatus.

The apparatus 1 may further include inertial sensors, such as an accelerometer, a gyroscope, etc., for positional and rotational tracking. This device may be used for example to adapt the rendering of audio and/or visual signals to the position and orientation of the user's head. A magnetometer may be used for determining the vertical direction. Moreover, a satellite or terrestrial based navigation system, such as a GPS, Magellan or cell-based positional system, may be used for determining the absolute position of the apparatus. A Wi-Fi and/or LoRa receiver may also be used for determining the current location of the apparatus.

The various components of the apparatus 1 may be controlled by processing means 131, such as for example a microprocessor, a microcontroller or a FPGA module. The microprocessor 131 includes or access a memory 1310 with various software module for performing the steps of the method of the invention.

A human control interface module 130, as a software and/or hardware module, controls the input-output interface modules 151-154. Beside standard controls, such as the volume, brightness of the display, etc., the human control interface module further allows the user to choose a scenario, i.e. a setup for defining which audio sources should be enhanced, modified, annotated or otherwise augmented. The scenarios may be created, stored, improved and selected in the apparatus; preferably, they are stored in a remote server, for example in the cloud, in order to makes their sharing and selection easier.

Figure 3:
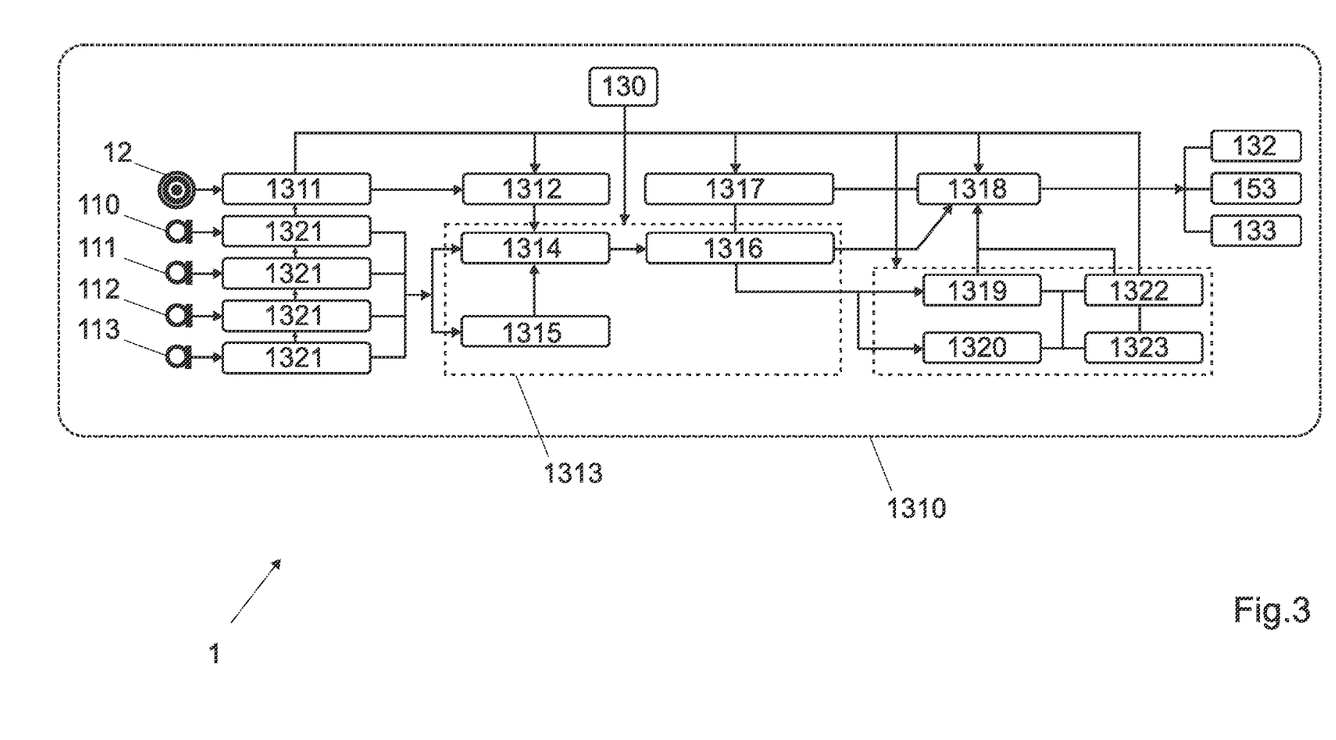
FIG. 3 is a schematic bloc diagram of the software components of the apparatus.

FIG. 3 schematically illustrates some software and/or hardware modules of an apparatus. The software modules may be executed by the processing means 131 in order to perform the steps of the method. The software modules may be grouped as a software program 1310.

Audio signals from the microphones 110-113 are pre-processed by pre-processing modules 1321. In a similar way, the video signal captured by the camera 12 is pre-processed by the pre-processing module 1311. The pre-processing may include for example, and without limitation, sampling, filtering and/or denoising of the audio respectively of the video signals.

The pre-processed audio signals are then processed by the audio processing module 1313. The audio processing may include echoes cancellation or modifications, beamforming of audio signals retrieved from various microphones in each array of microphones with a beamformer 1314, and filtering/equalization with a filtering/equalization module 1316. The beamformer may exploit the geometry of the surrounding space, if this geometry is known and could be derived. The beamformer may use signals from the inertial sensors to aid the beamforming. For example, the beamformer may use the acceleration and rotation signals for preventing the beam to follow the movements of the head when the user moves his head.

The filtering/equalization module 1316 increases the intelligibility of the sound by filtering, room equalization, and adaptive noise cancelling for example.

Moreover, the processing module 1313 includes an audio source separation module 1315 for separating audio sources based on their location and, possibly, on their characteristics. The module 1315 may also determine the 3D position of audio sources. The localisation and separation of audio sources may be based for example on a classification of echoes and analysis of time of arrival of various echoes caused by reflexions against different reflective surfaces of the environment. An example of method that could be used by the audio source separation module 1315 is described in US2015106053A1 whose content is included hereby by reference. The module 1315 may also use information from the camera 12 and/or from other sensors for determining the location of audio sources. Moreover, the module 1315 may also determine the shape of the room by determining the position of reflective surfaces.

Additionally, as already mentioned, the position of the apparatus may be determined for example from the time of arrivals of different echoes from different audio sources, and/or with a satellite-based geolocalisation system, and/or with computer vision methods for example. The position of the apparatus may be used for selecting the additional information to display. It may also or alternatively be used for selecting a specific scenario to apply at a given location.

The localisation of the audio source, and/or the localisation of the apparatus, may be absolute, for example with geographic coordinates, names of places, or on a map. It may also or alternatively be relative. For example, it is possible to determine that an audio source is in front of the apparatus, or 10 meters to the left, and to present this information.

The video signals output by the video pre-processing module 1311 are transmitted to a feature recognition module 1312. The features recognition module extracts features from each image captured by the camera, in order to perform computer vision algorithms, for example in order to recognize forms in the image, detect hands, eyes or body gestures etc. The feature recognition module 1312 may be arranged for visually detecting and recognizing elements, such as for example human faces, parts of a machine, etc. Some of those elements may be associated with corresponding audio sources. Some of those elements may be tracked during a plurality of successive frames.

An auralization module 1317 recreates binaural audio realistic signals according to the user desires and to the user environment. The recreated audio signal may include for example enhanced audio sources, new audio sources, or audio sources at a different location or in a different environment.

A speech processing module 1319 and the audio source classification module 1320 may perform additional steps on the selected audio source, such as for example converting audio into text, translating the text, and/or classifying the audio source in order to detect the type of audio source. The modules 1319 and 1320 can perform a conversion into text, and/or a translation, and/or a classification, in the apparatus or, preferably, trigger the same operations from a remote server or from the cloud.

A correspondence could be established between features or elements in the video image and audio sources. For example, a correspondence could be established between faces of persons recognised in the image, and audio sources classified as voices. The correspondence may be user independent, and for example based on a correspondence between the position of features in the images and audio sources. The correspondence may be user-dependent, and based for example on a face recognition and speaker identification for associating the face of a known person with his voice.

The classification may be based on a classification of a visual element associated with an audio source. The classification of audio source may include an interpretation of the signal from the audio source. For example, the classification may include the classification of a signal from an audio source as a nightingale song.

The classification may also include a speech-to-text conversion. The classification may include other types of recognition. The classification may be based on the location of the audio source. For example, the sound of a bell precisely located at the North end of the Westminster Palace in London may be classified as "Big Ben Bell" based on this location and on the audio signal from this source.

A neural network system, a hidden Markov system or a hybrid system could be used for classifying an audio source. The classifier may be a self-learning system and trained with feedbacks from the user or from other users. The classifier may receive the processed audio signals from a source, possibly associated visual features, and possibly other information that could help for the classification, such as the location of the audio source. The classification may be user-independent. The classification may be user-dependent. For example, a classifier may be trained for recognizing speakers in the circle of acquaintances of a specific user, and for augmenting The audio source selection module 1323 receives a list of detected audio sources from the classification module 1320, as well as a selection of audio sources from the human control interface 130. The user can thus select one or a plurality of audio sources among all the classified audio sources.

The user can use the human control interface 130 for selecting one or a plurality of audio sources. In one embodiment, the selection is performed before the classification, among all the distinct sources identified by the separation module. In another embodiment, the selection is performed after the classification, which is performed on all the identified sources for facilitating their selection.

In a possible embodiment, the identified audio sources are listed on a display, as a list or with a symbol at the position of each audio source.

The selection of an audio source may be performed with a hand gesture, for example by pointing with the figure in the direction of the selected audio source. The camera 12 captures this gesture and the processor recognizes it and determines all the distinct audio sources in the pointed direction.

The selection of an audio source may also be performed by gazing in its direction. An eye tracking module may determine the gazing direction and the processor determines all the audio sources in this direction. The user may confirm the selection of an audio source by maintaining the eye direction during a minimal duration or with a specific eye command.

The selection of an audio source may also be performed on a display, for example on a touch display of the apparatus 1 or of a wirelessly connected device.

The selection of an audio source may also be automatic. The module 1323 may for example determine the most interesting audio sources, or the audio sources which the user most likely wants to augmente or otherwise annotate.

The automatic selection of audio source may depend on the user's location. For example, in a classroom, the teacher may be automatically selected as audio source.

The selection of audio source may depend on the location of the source, as determined by the module 1315 and/or with a computer vision module.

A selected audio source may be tracked when the user and/or the source moves. The tracking may be based on visual and/or audio signals.

The automatic selection of audio source may depend on the user's characteristics or profiles. A child may for example be presented with different audio sources than an adult or elderly person. The user's characteristics may for example depend on its hearing impairment. The user profile may define some user's interests.

The automatic selection of an audio source may depend on a selected scenario, for example on an automatic or manually selected scenario. For example, a scenario "forest" may be automatically or manually selected when the user is in a forest and trigger an automatic enhancement and annotation of typical audio sources in a forest, such as bird songs or waterfalls. Other scenarios may define which type of classified audio sources need to be selected, and how those sources need to be modified or augmented with additional information.

A scenario may be automatically selected. The automatic selection of scenario may depend on the user's location, on the available Wi-Fi network, on signals from a beacon, on results from a computer vision algorithm and/or on recommendations from other users. For example, a user may decide to trust the most popular scenario at a given location.

A machine learning algorithm may be used for selecting the most appropriate scenario for a given user at a given location and time. The algorithm may use neural network trained with recommendations or feedbacks from other users.

A user may store and retrieve preferred scenarios. Those scenarios may be associated with a given location or with some conditions. For example, a user may store one scenario for the forest, and a different scenario for the classroom.

New scenarios may be created by the users, for example with a wirelessly connected remote device. Scenarios may also be modified and adapted. Scenarios may also be shared among users, for example as computer files. In one example, several fans in a golf competition may share a common scenario where each sound of a ball being hit triggers a specific additional information, such as the otherwise determined distance to the hole.

The annotation module 1322 retrieves additional information related to the selected audio sources, and delivers this information to the output interface 1318. The additional information is based on the classification of the source, and may be retrieved from a database of annotations in the apparatus, in the remote device, or from a remote server or database. The additional information may be delivered as text, image, video, and/or audio signal. For example, the annotation module 1322 may retrieve the Wikipedia page related to previously identified bird in the audio scene, and prepare this page for display or audio restitution to the user.

The module 1322 may also add entirely new audio sources into an audio scenes, including audio sources which are not necessarily related to any classified object. In one example, the module 1322 may for example add the sound of a waterfall in a living room, if the user requests this.

The module 1322 may also remove some audio sources, for example all the unselected audio sources, or a specific audio source. For example, in a bar, the module 1322 may remove all the music and speech, with the exception of a specifically selected person whose voice in enhanced.

The module 1322 may also modify some audio sources. For example, the module 1322 may replace the voice of a person with a different voice, or replay an utterance by its translation in a different language. This modification or replacement may be performed in real time. The module 1322 may access a remote server, for example in the cloud, to perform those operations.

The output interface 1318 merges all the information for the user, and renders an audio and/or visual signal with additional information. For example, the output interface 1318 may output an audio signal with the acoustic transducers 153, wherein the modified audio signal may be modified with respect to the captured audio signal, and may additionally include additional information relative to at least one audio source in the scene.

The above described apparatus and method may be used in a variety of applications, depending on the selected scenario. In one example, the apparatus may be used as an intelligent hearing aid for automatically or manually selected audio sources to be enhanced, and enhancing those audio sources with additional information, such as a text transcription of utterances from the selected source. The apparatus may also be used for selectively selecting whose talkers need to be amplified in a crowd. For example, a user may select who he wants to listen in a noisy café, simply by looking them or by selecting the person with any audio source selection means.

In another application, the apparatus may be used as a translating aid for automatically replacing the voice of a person by a synthetic voice in a different language. The translation may be done locally or in a local server, for example in the cloud.

In a classroom or in a theatre, the apparatus may be used as a kind of "audio goggle" for enhancing a selected audio source, for example the voice of the teacher or from the actors. This information may be completed with additional information, such as the name of the actors, a definition of some words, etc.

If a user does not like the music played in restaurant, he can remove it, or replace it, without modifying the other audio sources in his environment.

A worker in a noisy factory may focus his attention on the noises of the machine he is responsible for, and have those noises commented, while other noises are removed or modified. In a similar way, a person working in an open space may reduce the ambient noise and remove all the phone rings, except his own phone; if it rings, all other sounds will be automatically further attenuated, and the name of the caller may be displayed or spoken. An identical phone ring from a different phone set at a different location will not be heard.

The additional information may also include the name of an object, and/or the distance of the object. For example, a user looking at a car may have the type of car displayed or spoken, as well as his distance to the car.

Even if the described examples are related to glasses, the invention can be applied to other type of wearable apparatus, including headsets, hearing aids, hearing buds, smartphones, tablets, head-up displays, etc.

The various operations of methods described above may be performed by any suitable means capable of performing the corresponding functions. The means may include various hardware and/or software component(s) and/or module(s), including, but not limited to a circuit, an application specific integrated circuit (ASIC), a FPGA, or a microprocessor.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for presenting additional information related to a given audio scene to a user of a wearable apparatus, comprising:
 capturing audio signals from the audio scene with a plurality of microphones;
 outputting an audio signal with a plurality of acoustical transducers;
 processing the captured audio signals, the processing comprising filtering, equalization, echoes processing and/or beamforming;
 distinguishing respective audio signal sources corresponding to the captured audio signals, using the processed audio signals;
 adding a virtual audio signal source into the audio scene;
 selecting at least one of the audio signal sources;
 classifying the selected at least one audio signal source;
 retrieving additional information related to the classified audio signal source;
 presenting the additional information to the user.

2. The method of claim 1, further comprising modifying a captured audio signal, shaping the modified audio signal, a step of shaping a modified audio signal, and delivering the shaped modified audio signal with a plurality of acoustical transducers.

3. The method of claim 1, wherein selecting at least one of the audio signal sources comprises at least one of: the user pointing at the source, the user gazing at the source, the user uttering an audible selection command, and the user inputting a selection on a touch screen.

4. The method of claim 1, wherein selecting at least one of the audio signal sources comprises automatically selecting at least one of the audio signal sources based on at least one of the user's current location, and a characteristic of the user.

5. The method of claim 1, wherein selecting at least one of the audio signal sources comprises selecting at least one of the audio signal sources based on matching a user's current location with one of a plurality of scenarios, wherein a given scenario defines which of the at least one audio signal sources is selected.

6. The method of claim 5, wherein the scenario is shared among a plurality of users.

7. The method of claim 1, further comprising tracking a selected audio signal source.

8. The method of claim 1, further comprising modifying an audio source.

9. The method of claim 1, further comprising determining an acoustic shape of a room in which the wearable apparatus is located, and recreating a virtual version of the audio scene corresponding to the determined acoustic shape of the room in which a selected audio signal source is enhanced.

10. The method of claim 1, wherein the additional information is related to a location and to a classification of the at least one audio signal source.

11. A wearable apparatus for presenting additional information related to an audio scene, comprising:
   a plurality of microphones for capturing audio signals from the audio scene;
   a plurality of acoustic transducers for outputting an audio signal;
   an audio pre-processing module for processing the captured audio signals, the pre-processing comprising one or more of filtering, equalization, echoes processing and beamforming;
   an audio signal source separation module for separating and distinguishing audio signal sources in the audio scene from one another;
   a virtual audio source adding module for adding a virtual audio signal source into the audio scene;
   an audio signal source selection module for selecting at least one separated audio signal source;
   a sound classification module for classifying the selected audio signal source;
   an additional information retrieving module for retrieving additional information related to the selected audio signal source;
   an information presentation module arranged for presenting the retrieved additional information.

12. The wearable apparatus of claim 11, further comprising:
   a feature processing module;
   a video pre-processing module operably connected to the feature processing module;
   a digital camera operably connected to the video pre-processing module.

13. The wearable apparatus of claim 11, wherein the wearable apparatus is a pair of glasses or a heads-up display wearable on the head.

14. A method for presenting additional information related to a given audio scene to a user of a wearable apparatus, comprising:
   capturing audio signals from the audio scene with a plurality of microphones;
   outputting an audio signal with a plurality of acoustical transducers;
   processing the captured audio signals, the processing comprising filtering, equalization, echoes processing and/or beamforming;
   determining an acoustic shape of a room in which the wearable apparatus is located;
   distinguishing respective audio signal sources corresponding to the captured audio signals, using the processed audio signals;
   selecting at least one of the audio signal sources;
   recreating a virtual version of the audio scene corresponding to the determined acoustic shape of the room in which one said selected audio signal source is enhanced;
   classifying at least one said selected audio signal source;
   retrieving additional information related to the classified audio signal source; and
   presenting the additional information to the user.

15. A method for presenting additional information related to a given audio scene to a user of a wearable apparatus, comprising:
   capturing audio signals from the audio scene with a plurality of microphones;
   outputting an audio signal with a plurality of acoustical transducers;
   processing the captured audio signals, the processing comprising filtering, equalization, echoes processing and/or beamforming;
   distinguishing respective audio signal sources corresponding to the captured audio signals, using the processed audio signals;
   selecting at least one of the audio signal sources, wherein selecting at least one of the audio signal sources comprises selecting at least one of the audio signal sources based on matching a user's current location with one of a plurality of scenarios, wherein a given scenario defines which of the at least one audio signal sources is selected;
   classifying the selected at least one audio signal source;
   retrieving additional information related to the classified audio signal source;
   presenting the additional information to the user.

16. A wearable apparatus for presenting additional information related to an audio scene, comprising:
   a plurality of microphones for capturing audio signals from the audio scene;
   a plurality of acoustic transducers for outputting an audio signal;
   an audio pre-processing module for processing the captured audio signals, the pre-processing comprising one or more of filtering, equalization, echoes processing and beamforming;
   an audio signal source separation module for separating and distinguishing audio signal sources in the audio scene from one another;
   an audio signal source selection module for selecting at least one separated audio signal source;
   a module recreating a virtual version of the audio scene corresponding to the determined acoustic shape of the room in which one said selected audio signal source is enhanced;
   a sound classification module for classifying the selected audio signal source;
   an additional information retrieving module for retrieving additional information related to the selected audio signal source;
   an information presentation module arranged for presenting the retrieved additional information.

17. A wearable apparatus for presenting additional information related to an audio scene, comprising:
   a plurality of microphones for capturing audio signals from the audio scene;
   a plurality of acoustic transducers for outputting an audio signal;
   an audio pre-processing module for processing the captured audio signals, the pre-processing comprising one or more of filtering, equalization, echoes processing and beamforming;
   an audio signal source separation module for separating and distinguishing audio signal sources in the audio scene from one another;
   an audio signal source selection module for selecting at least one separated audio signal source, wherein the selecting is based on matching a user's current location with one of a plurality of scenarios, wherein a given scenario defines which of the at least one audio signal sources is selected;

a sound classification module for classifying the selected audio signal source;
an additional information retrieving module for retrieving additional information related to the selected audio signal source;
an information presentation module arranged for presenting the retrieved additional information.

* * * * *